(No Model.)
C. E. GETCHELL.
APPARATUS FOR MAKING SULPHUROUS ACID.
No. 378,673. Patented Feb. 28, 1888.
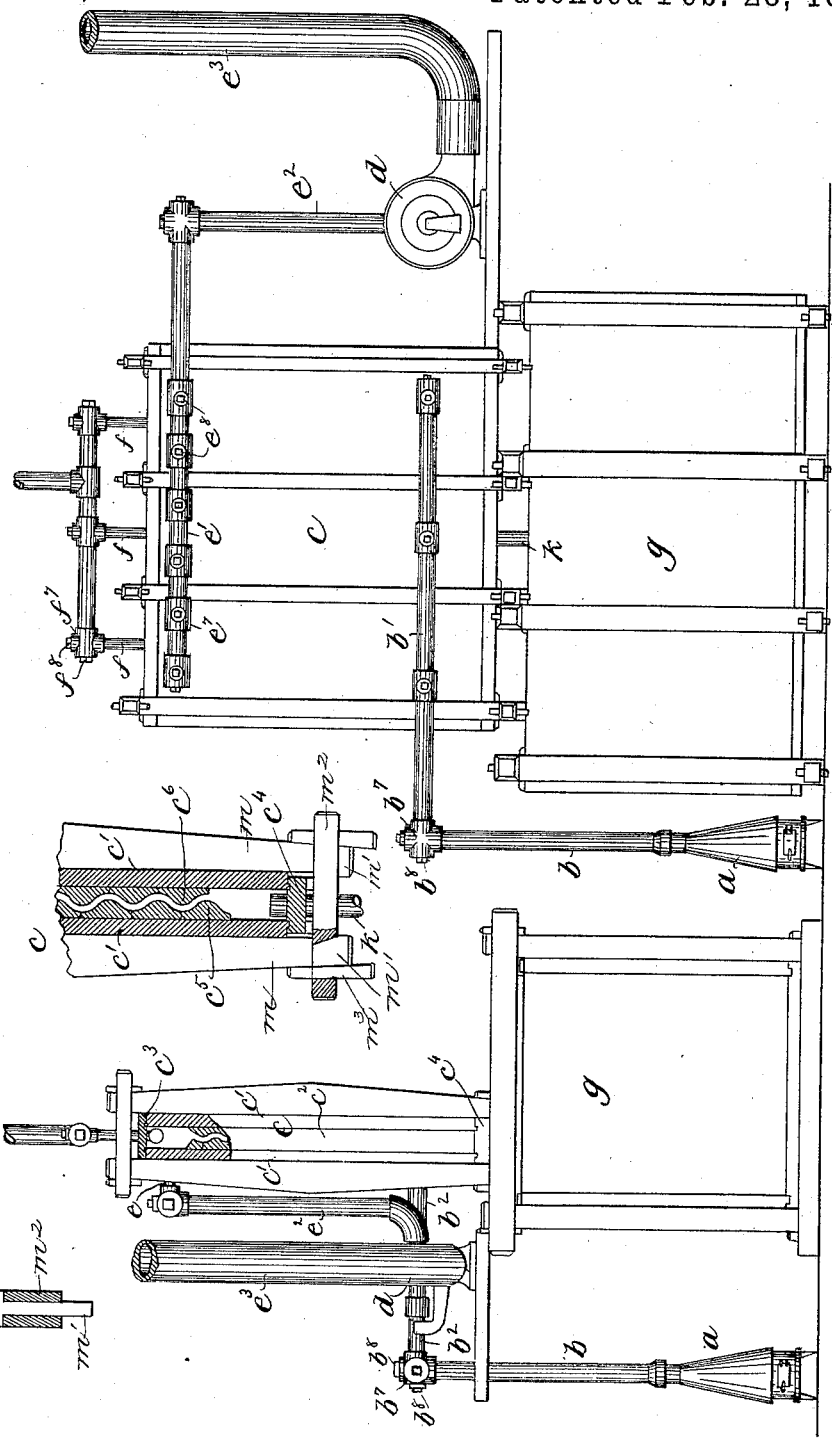
Witnesses,
Jas. J. Maloney.
M. E. Hall.
Inventor,
Charles E. Getchell
by Jo. P. Livermore
Att'y.

UNITED STATES PATENT OFFICE.

CHARLES E. GETCHELL, OF WALTHAM, MASSACHUSETTS, ASSIGNOR OF ONE-HALF TO STEPHEN N. BOURNE, OF MANCHESTER, NEW HAMPSHIRE.

APPARATUS FOR MAKING SULPHUROUS ACID.

SPECIFICATION forming part of Letters Patent No. 378,673, dated February 28, 1888.

Application filed April 30, 1887. Serial No. 236,615. (No model.)

*To all whom it may concern:*

Be it known that I, CHARLES E. GETCHELL, of Waltham, county of Middlesex, State of Massachusetts, have invented an Improvement in Apparatus for Making Sulphurous Acid, of which the following description, in connection with the accompanying drawings, is a specification, like letters on the drawings representing like parts.

My invention relates to an apparatus for making sulphurous acid, which is commonly produced commercially by dissolving in water the fumes arising from the combustion of sulphur with the oxygen of the air. In this manufacture the cost of materials is very small, and the efficiency and economy of the apparatus depend, mainly, on the amount of the acid liquid that can be produced in a given time and on the cost of the apparatus itself.

The invention is embodied in an apparatus by which the acid liquid is produced with great rapidity in large quantities with relation to the size and cost of the apparatus, the main novel portion of which is that in which the fumes are presented to the water, which has, as is well known, a natural affinity for such fumes, absorbing or dissolving them readily.

The apparatus comprises a stove or furnace for burning the sulphur, so as to produce the acid fumes, which are a combination of sulphur and oxygen, and a duct or flue for conveying the fumes to the combining-chamber, which is a vertical chamber having a long and wide but thin passage extending from top to bottom, the inner surfaces of the said chamber being close together and having a narrow space between them, and being curved or broken, so that fluid passing upward or downward through the chamber is deviated from a direct path and moves in a sinuous or zigzag path, impinging against both walls of the chamber at many points. The water is introduced at the top of the chamber and flows in a continuous film or stream down the walls thereof, and the acid fumes are introduced at the lower end of the chamber and pass upward therethrough, and thus impinge upon or come in contact with the films or coating of water at many points, and are taken up by or dissolved in said water, which is thoroughly saturated when it arrives at the lower end of the chamber, and constitutes the liquid commercially known as "sulphurous acid." The lower end of the chamber is provided with an outlet for the acid liquid, through which the said liquid flows into a suitable tank or reservoir below the combining-chamber. The upper part of the chamber is provided with an outlet for the portion of the fumes or products of combustion that is not taken up by the water, and the apparatus also has means for forcing the said fumes through the chamber, being shown in this instance as an exhaust-fan operating in said outlet for the fumes, and causing them to be drawn with rapidity into and through the chamber, and the unconsumed nitrogen of the air, together with any portion of the acid fumes which might not have been absorbed by the water, to be delivered at any desired point.

Figure 1 is a front elevation of an apparatus for making sulphurous acid embodying this invention; Fig. 2, an end elevation thereof, the upper portion of the combining-chamber being shown in section; Fig. 3, an enlarged section of a portion of the lower part of the combining-chamber, and Fig. 4 a sectional detail showing the means for fastening the walls of the chamber together.

The apparatus comprises a stove, $a$, for burning the sulphur, a duct or flue, $b$ $b'$ $b^2$, leading therefrom, a combining-chamber, $c$, into which the branches $b^2$, as many as may be desired, enter near the lower end of said chamber, an outlet passage or duct, $e$ $e'$ $e^2$, leading from the upper part of said chamber, an exhaust-fan, $d$, and waste or discharge flue $e^3$, communicating with the said outlet-passage $e^2$ from said chamber.

The apparatus also comprises inlet-passages $f$, as many as may be desired, at the top of the chamber for the water that is to take up the fumes, and a tank or reservoir, $g$, below the chamber, communicating therewith through one or more outlet-passages, $k$, (see Fig. 3,) which reservoir receives the acid liquid which may be withdrawn, as desired.

The combining-chamber $c$ is essentially a flat wooden box composed of walls $c'$, (see Fig. 3,) of large area, and end pieces, $c^2$, Fig. 2, and top and bottom pieces, $c^3 c^4$, all of which are properly joined together to insure tightness and are fastened by wooden beams $m$, which rest against the side walls, $c'$, and are provided with dovetail-shaped tenons $m'$, passing through suitable mortises in connecting cross-beams $m^2$, and are held up tightly against the walls of the box by wedges or keys $m^3$, as best shown in Fig. 3. The entire chamber is thus made of considerable strength and tightness entirely without the use of metal fastenings in any part, as it is found that such fastenings, even if not exposed at the inside of the chamber, are acted upon by the acid to the detriment of the apparatus and of the product. This box stands in vertical position on one edge, thus forming a chamber the vertical walls of which have large area, while the chamber itself is of very small cubic contents. The walls $c\ c'$ of the said chamber are provided with projecting portions $c^5 c^6$, those on one wall extending into the recess between each two adjacent projections on the other wall, so as to leave between them a waved or zigzag passage, which is very thin, although the sides of it are long and broad, and consequently of very great area. The projections are shown in this instance as curved, so as to make a waved passage; but this is not essential, as they might be of any shape—as, for instance, square or half-round cleats upon the inner surface of the walls—the object being to increase the amount of surface and at the same time to prevent a direct straight passage up or down through the chamber, so that a fluid, either liquid or gaseous, will impinge upon both surfaces in passing rapidly through the chamber, or a liquid in flowing down by gravity will practically cover both surfaces, forming a film or coating of large area on each.

The inlet and outlet pipes both for the fumes and liquid are preferably divided into a number of branches, so as to distribute the fluids throughout the length of the chamber, the water-pipes $f$ being shown as entering at three points and preferably terminating within the chamber in deflectors or nozzles that will spread the liquid entering, which will not be sufficient in quantity to fill the entire passage between the walls of the chamber, but will merely wet both the walls or flow down along them in the form of a thin film, although such flow may be very rapid and a large quantity of water carried through the chamber in a comparatively short time. The fumes entering the side of the chamber near the lower end through the branch pipes $b^2$, and being drawn out from the upper end of the chamber, will pass rapidly upward through the narrow passage in a zigzag direction, and will almost constantly impinge against the downwardly-flowing films of water, so that the water and fumes will be brought into intimate contact with great rapidity, and the water will absorb the fumes to saturation in its rapid downward descent.

The ducts or pipes for the different fluids are all made in straight pieces joined by fittings, as shown at $b^7 e^7 f^7$, which fittings have openings opposite the ends of the several pieces, closed by removable plugs $b^8 e^8 f^8$, &c., so that by removing said plugs a straight passage will be afforded through the pipe for the introduction of a cleaning-brush. In other words, cross-fittings are used at the different junctions, instead of using T or elbow fittings, as is commonly the case in setting up piping of this kind.

By the herein-described construction of the combining-chamber the water will become thoroughly impregnated with the acid fumes while flowing with great rapidity, and consequently the acid liquid can be produced in very large quantities by comparatively small apparatus.

The apparatus, as above shown and described, is arranged to cause the fumes to flow through the thin passage of the combining-chamber in the direction opposite to the flow of liquid, this being an effective way to bring the fumes and liquid together; but it is obvious that the fumes might flow through the chamber in the same direction as the liquid or in a direction transverse to the flow of the liquid without departing from the invention.

I claim—

1. In an apparatus for making sulphurous acid, a combining-chamber having walls of large area, but at small distance apart, the said walls being provided with transverse projections or ridges, as described, producing a thin sinuous or zigzag passage between them, said chamber being provided with an inlet for water near its upper part and inlet and outlet passages for acid fumes, whereby the water and fumes both pass wholly through the chamber and are brought into intimate contact with one another in such passage, substantially as described.

2. In an apparatus for making sulphurous acid, a combining-chamber having its walls close together, the said walls being provided with ridges, producing a sinuous or zigzag passage between them, said chamber being provided with an inlet for water and an outlet for acid fumes near its upper part and an inlet for acid fumes at its lower part, whereby the water and fumes are brought into intimate communication with one another in their passage through the chamber.

In testimony whereof I have signed my name to this specification in the presence of two subscribing witnesses.

CHARLES E. GETCHELL.

Witnesses:
M. E. HILL,
JOS. P. LIVERMORE.